Jan. 2, 1962     J. E. BROWN     3,015,166
MEASURING GAUGE
Filed Nov. 24, 1958
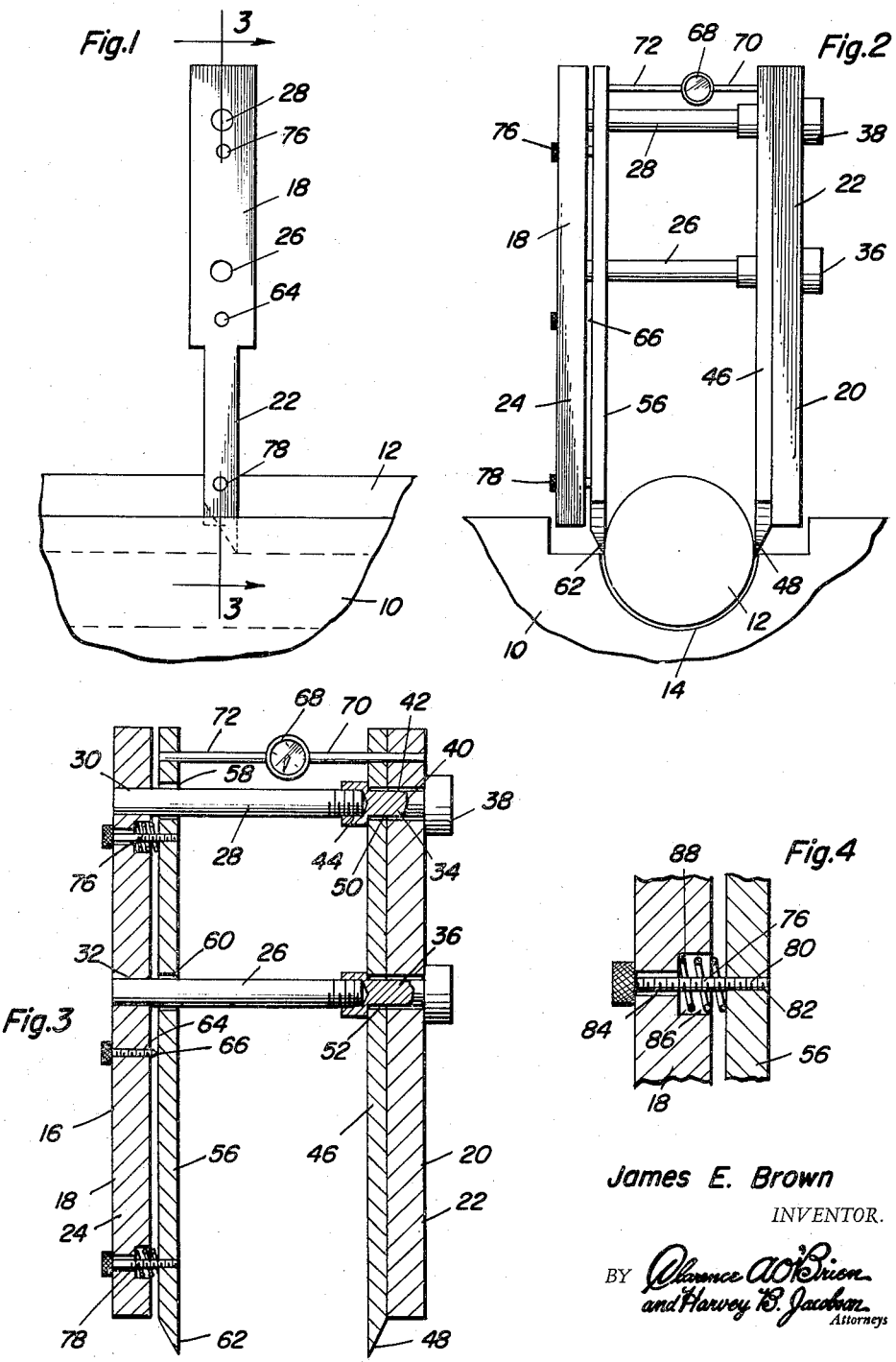
James E. Brown
INVENTOR.

United States Patent Office 3,015,166
Patented Jan. 2, 1962

3,015,166
MEASURING GAUGE
James E. Brown, 211 College St., Henderson, N.C., assignor of thirty-seven and one-half percent to Spencer H. Ferrell, Durham, and thirty-seven and one-half percent to Florence N. Bailey, Henderson, N.C.
Filed Nov. 24, 1958, Ser. No. 775,777
5 Claims. (Cl. 33—148)

This invention relates to geometrical instruments and more particularly to a measuring gauge which has special application in connection with crankshafts of engines.

An object of the invention is to provide an instrument for the purpose of measuring the crankshaft of a motor vehicle engine, especially engines that are designed such that it makes it difficult if not impossible to use ordinary micrometers for measuring the crankshaft, without removing the engine from its mounts and removing the crankshaft from the engine block.

A further object of the invention is to provide a measuring gauge which has a pivoted beam between a pair of sides, one end of the beam adapted to be deflected in accordance with the diameter being measured and the other end of the beam having a dial indicator or the like thereon to reflect the amount of deflection of the beam.

Although the invention is applicable in connection with the measurement of crankshafts of engines, it has equal application in many other environments such as in machine shops, for measuring other shafts or for measuring the diameter or other dimension of parts and pieces which are quite difficult to reach with ordinary instruments.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a side view of the instrument showing it being used with a crankshaft fragment while it remains in place within an engine block.

FIGURE 2 is a front view of the instrument in FIGURE 1.

FIGURE 3 is a longitudinal sectional view of the instrument, and taken on the line 3—3 of FIGURE 1.

FIGURE 4 is an enlarged fragmentary detail of construction.

In the accompanying drawings there is illustrated a part of an engine block 10 and a typical crankshaft 12 with space 14 between the crankshaft and block. The space 14 is that which remains when the bearing insert is removed.

Measuring instrument 16 has a pair of flat sides 18 and 20 which are generally in rectangular with reduced ends 22 and 24. The sides remain assembled by bolts 26 and 28. One pair of ends of bolts 26 and 28 are pressed or otherwise fastened in openings 30 and 32 of side 18, and the other ends of the bolts 26 and 28 are threaded into nuts 34 and 36. Each nut has a head 38 bearing on the outside surface of side 20, a shank 40 that is passed through openings 42 in the same side, and internally threaded sockets 44 within which the threaded bolt is received.

A gauge strip 46 made of flat, hard material, is fitted flush against the inside surface of side 20. It has a pointed lower end 48 that constitutes a feeler. A pair of holes 50 and 52 are in gauge plate 46, and the shanks of the two nuts extend through these holes. The sockets on the nuts have shoulders which contact the inside surface of gauge plate 46 thereby holding the gauge plates assembled with side 20.

A rocking beam 56 is located adjacent the inside surface of side 18. This rocking beam has enlarged holes 58 and 60 through which bolts 28 and 26 pass. It also has a pointed end 62 that constitutes the second feeler of the pair of feelers, cooperating with feeler 48 to take the necessary measurements.

An adjusting screw 64 is threaded in a tapped opening in side 18 and has a pointed end 66 preferably at the center of beam 56. In this way there will be a 1-to-1 movement between the feelers 62 and the upper end of the beam 56 at which an indicator 68 is connected.

Indicator 68 may assume a number of forms, one of which is a dial indicator having rod 70 attached to its casing and attached to side 20. Push rod 72 is attached to the mechanism of the dial indicator and to the measuring beam 56. Therefore, rocking deflection of beam 56 will cause a corresponding deflection on the dial indicator 68 due to axial movement of the push rod 72. Diameter measurements of shafts or any other type of measurement may then be read directly on the face of indicator 68, whenever the feelers 48 and 62 are deflected with respect to each other. It will be apparent to anyone skilled in the art that the indicator necessarily responds to axial movement of the rod 72 to measure deflection of the beam. Depending on the type of indicator used therefore, the rod 72 when axially moved by beam 56 will be accommodated at its indicator end for lateral displacement.

There are resilient means reacting on beam 56 to retain the beam centered that is, parallel to gauge plate 46. These means consist preferably of two assemblies 76 and 78 each of which is identical in construction. Assembly 76 is detailed in FIGURE 4. As shown in that figure the assembly is composed of a screw 80 threaded in a tapped opening 82 in beam 56. The shank of the screw is passed through bore 84 in side 18 and also counterbore 86 aligned with bore 84. Screw 80 is passed loosely through bore 84. A spring 88 is seated in counterbore 86 and bears against the confronting surface of beam 56. Since assembly 76 is one side of fulcrum 66 and assembly 78 is on the other side of fulcrum 66, the two resilient assemblies will retain the beam 56 in a centered position that is, the position at zero setting for dial indicator 68.

In use, the feelers 48 and 62, being short, narrow and tapered will fit into small spaces as shown in FIGURE 2. The object to be measured, for instance crankshaft 12, may have its measurement read directly from the dial indicator 68 by simply slipping the feelers 62 and 48 alongside of the crankshaft. This deflects beam 56 or fails to deflect it. In either case the reading is capable of being taken directly from the dial indicator 68.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A measuring instrument for measuring comparatively inaccessible parts, said instrument comprising a pair of sides, means holding said sides in spatial relationship, a feeler connected with one of said sides, a measuring beam connected with the other of said sides and spaced from said feeler, said measuring beam having a second feeler and cooperating with the first mentioned feeler to constitute a pair thereof, a fulcrum on the other of said sides for said measuring beam and about which said beam is adapted to rock, and an indicator connected between said beam and the first mentioned side to measure the amount of deflection of said beam with respect to the first mentioned feeler, resilient means reacting on said beam to hold said beam in an initial position, said resilient means comprising a pair of springs, means holding said springs captive with respect to said beam and on opposite sides of said fulcrum.

2. A measuring instrument for comparatively inaccessible crankshafts, said measuring instrument comprising a frame constructed of a first side and a second side with said sides held spaced apart, a first feeler connected with said first side, a second feeler, a beam to which said second feeler is connected, means mounting said beam on said second side for rocking movement so that the feeler thereof is movable toward and away from said first feeler, a measuring instrument connected between said first side and said beam, and resilient means reacting on said beam and holding said beam yieldingly in one position, said resilient means including a spring located on opposite sides of the fulcrum of said beam and reacting on said beam and said second side.

3. The instrument of claim 2 wherein said second side has an opening for each spring, said springs located in said openings and thereby retained captive between said second side and said beam.

4. The combination of claim 2 wherein there are bolts connected to said beam and passed through said openings and loosely passed through additional openings aligned with the first mentioned openings to thereby hold said beam assembled with said second side.

5. A measuring instrument comprising a pair of spaced side means disposed parallel to each other, means for adjustably holding said side means in adjusted spaced parallel position relative to each other, fixed feeler means mounted at one end of one of said side means, measuring beam means biased to a position parallel to the said one side means, fulcrum means fixed to said other side means in contact with said beam means for pivotal deflection of the beam means about the fulcrum means, movable feeler means mounted at one end of the beam means and displacement indicator means operatively interconnecting the other ends of said one side means and beam means for indicating distance between said fixed and movable feeler means in response to displacement of the beam means.

References Cited in the file of this patent

UNITED STATES PATENTS 2,502,051    Kulcsar  ---------------- Mar. 28, 1950